| (12) | United States Patent | (10) Patent No.: | US 10,812,133 B1 |
|---|---|---|---|
| | Chavez | (45) Date of Patent: | Oct. 20, 2020 |

(54) SYSTEM AND METHOD FOR ROBUST INTERFERENCE DETECTION

(71) Applicant: Rockwell Collins, Inc., Cedar Rapids, IA (US)

(72) Inventor: Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/737,244

(22) Filed: Jan. 8, 2020

(51) Int. Cl.
*H04B 1/7103* (2011.01)
*H04B 1/71* (2011.01)

(52) U.S. Cl.
CPC ............ *H04B 1/7103* (2013.01); *H04B 1/71* (2013.01); *H04B 2201/709718* (2013.01)

(58) Field of Classification Search
CPC .................. H04B 1/7103; H04B 1/71; H04B 2201/709718
See application file for complete search history.

(56) References Cited

U.S. PATENT DOCUMENTS

| 6,404,830 B2 * | 6/2002 | Wiese ................. H04L 27/2602 375/346 |
| 7,277,475 B1 | 10/2007 | Nguyen et al. |
| 7,573,947 B2 | 8/2009 | Arad |
| 7,990,310 B2 | 8/2011 | Kwak et al. |
| 10,263,727 B2 | 4/2019 | Hudson |
| 2004/0228426 A1 * | 11/2004 | Oh ....................... H04B 1/1036 375/346 |
| 2007/0202829 A1 | 8/2007 | Roovers et al. |
| 2008/0057869 A1 * | 3/2008 | Strong ................ H04L 27/2608 455/63.1 |
| 2018/0324812 A1 * | 11/2018 | Abdelmonem ..... H04W 72/082 |

FOREIGN PATENT DOCUMENTS

| EP | 2151063 A1 | 2/2010 |
| EP | 3182661 A1 | 6/2017 |

* cited by examiner

*Primary Examiner* — Vineeta S Panwalkar
(74) *Attorney, Agent, or Firm* — Suiter Swantz pc llo

(57) ABSTRACT

A communication device may include a communication interface configured to receive signals and a controller configured to: receive an input signal based on the received signals; perform transform operations on the input signal to generate a spectral periodogram of the input signal; calculate spectral vector powers for each bin of a plurality of bins of the spectral periodogram; determine a median spectral power for a selected range of bins of the plurality of bins; generate a median-scaled spectral density vector based on the median spectral power and a reference spectral density of an expected signal; calculate a detection threshold vector based at least in part on the median-scaled spectral density vector; and identify one or more interference-including bins of the plurality of bins of the spectral periodogram by comparing the spectral vector powers for each bin of the plurality of bins to the detection threshold vector.

15 Claims, 9 Drawing Sheets

US 10,812,133 B1

SYSTEM AND METHOD FOR ROBUST INTERFERENCE DETECTION

BACKGROUND

Communication devices may utilize direct-sequence spread-spectrum (DSSS) modulation techniques for a wide variety of applications, including low-probability-of-intercept (LPI) signaling, anti-jam (AJ) signaling, code division multiple access (CDMA), and signaling over multipath channels. Communication devices configured to perform DSSS modulation techniques typically include wideband receivers which utilize a physical reception bandwidth range which is much greater than the information bandwidth of received signals. This renders DSSS receivers and other wideband receivers vulnerable to being desensitized by high-powered narrowband signals within the reception bandwidth range.

One solution to this narrowband interference problem is referred to as "narrowband interference excision." Under traditional narrowband interference excision techniques, interfering signals are detected and removed (excised) from the reception bandwidth. Once interfering signals are excised, conventional DSSS techniques may be used to demodulate and process the received signals. However, conventional narrowband interference excision techniques have been unable to effectively and/or reliably identify narrowband interference while simultaneously retaining "false positive" interference detections to an acceptably low level. Therefore, it would be desirable to provide a system and method which cure one or more of the shortfalls of the previous approaches identified above.

SUMMARY

A communication device is disclosed. In embodiments, the communication device includes a communication interface configured to receive one or more signals from one or more transmitting devices. The communication device may further include a controller including one or more processors configured to carry out a set of program instructions stored in memory, the set of program instructions configured to cause the one or more processors to: receive an input signal based on the one or more signals received by the communication interface; perform one or more transform operations on the input signal to generate a spectral periodogram of the input signal, the spectral periodogram including a plurality of bins; calculate spectral vector powers for each bin of the plurality of bins of the spectral periodogram; determine an ordered statistic spectral power for a selected range of bins of the plurality of bins; generate a statistically-scaled spectral density vector based on the ordered statistic spectral power and a reference spectral density of an expected signal; calculate a detection threshold vector based at least in part on the statistically-scaled spectral density vector; and identify one or more interference-including bins of the plurality of bins of the spectral periodogram by comparing the spectral vector powers for each bin of the plurality of bins to the detection threshold vector.

In some embodiments of the communication device, the controller is further configured to: perform one or more excision operations on the one or more interference-including bins of the plurality of bins of the spectral periodogram to generate a modified spectral periodogram; and generate an output signal based on the modified spectral periodogram.

In some embodiments of the communication device, performing one or more excision operations on the one or more interference-including bins of the plurality of bins of the spectral periodogram to generate a modified spectral periodogram includes scaling at least one of a signal magnitude value or a signal phase value of each of the one or more interference-including bins of the spectral periodogram to zero.

In some embodiments of the communication device, performing one or more excision operations on the one or more interference-including bins of the plurality of bins of the spectral periodogram to generate a modified spectral periodogram includes: scaling a signal magnitude value of each of the one or more interference-including bins to a pre-selected signal magnitude value; and retaining a signal phase value of each of the one or more of the interference-including bins of the spectral periodogram.

In some embodiments of the communication device, identifying one or more interference-including bins of the plurality of bins of the spectral periodogram includes: comparing the spectral vector powers for each bin of the plurality of bins to the detection threshold vector to generate a detection decision vector; and identifying the one or more interference-including bins of the plurality of bins based on the detection decision vector.

In some embodiments of the communication device, identifying one or more interference-including bins of the plurality of bins of the spectral periodogram includes: identifying one or more spectral vector powers for one or more bins of the plurality of bins which exceed an associated detection threshold value of the detection threshold vector.

In some embodiments of the communication device, the ordered statistic spectral power includes a median spectral power.

In some embodiments of the communication device, calculating a detection threshold vector based at least in part on the statistically-scaled spectral density vector includes: calculating the interference detection threshold vector based at least in part on the statistically-scaled spectral density vector and one or more threshold scale factors.

In some embodiments of the communication device, the spectral vector powers include a sum of the squares of a real portion and an imaginary portion of a complex vector within each bin of the plurality of bins of the spectral periodogram.

In some embodiments of the communication device, the expected spectral density for the one or more signals includes a filter shape of one or more filters of the communication device.

In some embodiments of the communication device, the one or more transform operations include a fast Fourier transform (FFT) operation.

In some embodiments of the communication device, the one or more transform operations include at least one of a discrete frequency transform operation or a wavelet transform operation.

In some embodiments of the communication device, the one or more transform operations are performed on the input signal to generate a first spectral periodogram of the input signal including a plurality of bins and an additional spectral periodogram of the input signal including a plurality of bins.

In some embodiments of the communication device, performing one or more excision operations on the one or more interference-including bins of the plurality of bins of the spectral periodogram to generate a modified spectral periodogram includes: performing one or more excision operations on the one or more interference-including bins of the plurality of bins of the first spectral periodogram to generate a first modified spectral periodogram; and performing one or more excision operations on one or more interference-including bins of the plurality of bins of the additional spectral periodogram to generate an additional modified spectral periodogram, wherein generating an output signal based on the modified spectral periodogram comprises generating an output signal based on the first modified spectral periodogram and the additional modified spectral periodogram.

A method for performing narrowband interference detection is disclosed. In embodiments, the method includes: receiving an input signal based on one or more signals received by a communication device; performing one or more transform operations on the input signal to generate a spectral periodogram of the input signal, the spectral periodogram including a plurality of bins; calculating spectral vector powers for each bin of the plurality of bins of the spectral periodogram; determining a median spectral power for a selected range of bins of the plurality of bins; generating a median-scaled spectral density vector based on the median spectral power and a reference spectral density of an expected signal; calculating a detection threshold vector based at least in part on the median-scaled spectral density vector; identifying one or more interference-including bins of the plurality of bins of the spectral periodogram by comparing the spectral vector powers for each bin of the plurality of bins to the detection threshold vector; performing one or more excision operations on the one or more interference-including bins of the plurality of bins of the spectral periodogram to generate a modified spectral periodogram; and generating an output signal based on the modified spectral periodogram.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
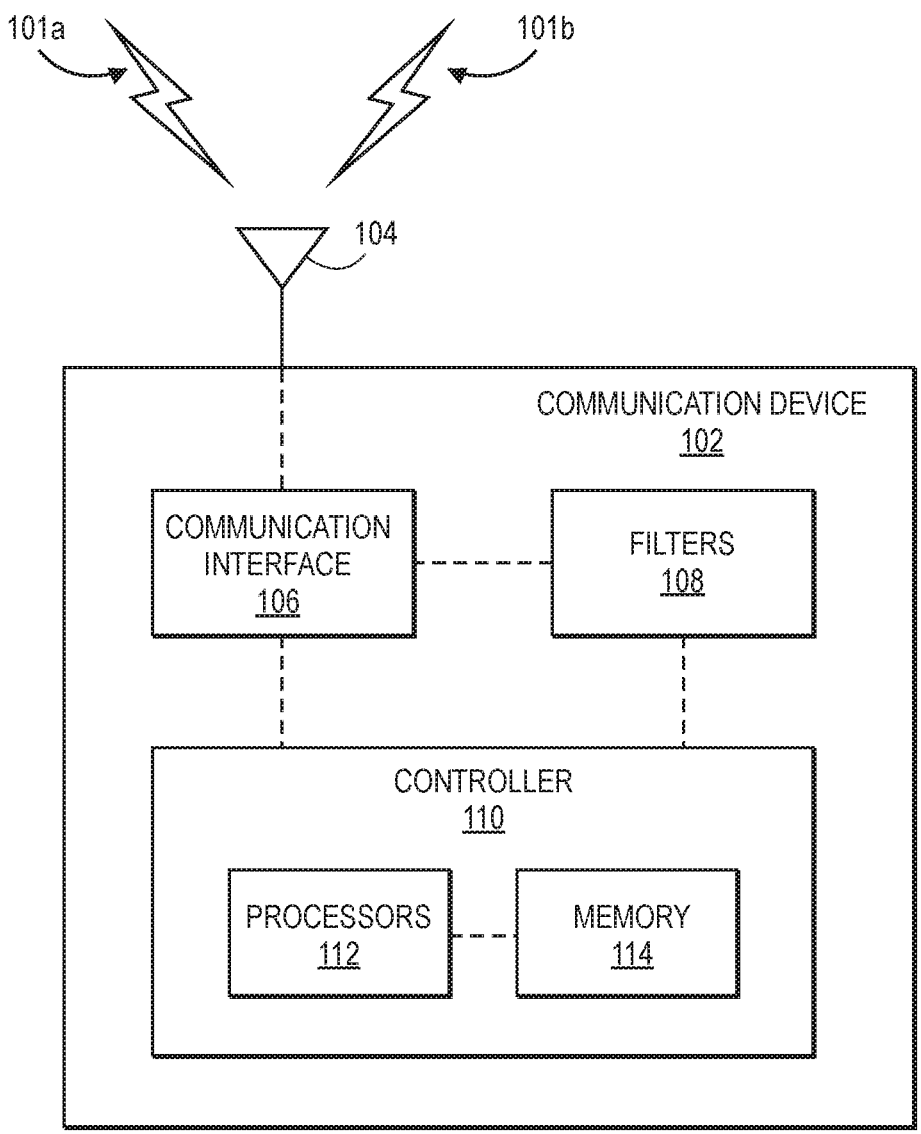
FIG. 1 illustrates a communication device for performing narrowband interference detection and/or excision, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Direct-sequence spread-spectrum (DSSS) receivers utilize a wide physical reception bandwidth, which renders the DSSS receivers vulnerable to narrowband interference. One solution to this narrowband interference problem is referred to as "narrowband interference excision." Under traditional narrowband interference excision techniques, interfering signals are detected and removed (excised) from the reception bandwidth. Once interfering signals are excised, conventional DSSS techniques may be used to demodulate and process the received signals.

Efficient interference excision requires reliable detection of narrowband interference without excessive false detections (i.e. identifying non-interference signals as interference). However, conventional narrowband interference excision techniques have been unable to effectively and/or reliably identify narrowband interference while simultaneously retaining "false positive" interference detections to an acceptably low level. For example, one conventional interference excision technique which utilizes fixed detection thresholds may reliably detect narrowband interference, but may falsely identify high-powered desired signals as interference, leading to an unacceptably high false-positive detection rate. Some other conventional interference excision techniques have attempted to address this false-positive detection issue by utilizing detection thresholds formed by averaging over a spectrum of interest. While these techniques may cut down on false detections, the interference detection threshold may be raised to an excessively high level by even a single high-powered narrowband interference signal, thereby diminishing the ability for communication devices to detect other less-powerful narrowband interference signals.

Accordingly, embodiments of the present disclosure are directed to a system and method which cure one or more of the shortfalls of the previous approaches identified above. Embodiments of the present disclosure are directed to a system and method for robust interference detection and excision. More particularly, embodiments of the present disclosure are directed to a system and method which provides reliable detection of narrowband interference, while maintaining low false-detection rates in the presence of interference signals and/or desired signals.

FIG. 1 illustrates a communication device 102 for performing narrowband interference detection and/or excision, in accordance with one or more embodiments of the present disclosure. The communication device 102 may include, but is not limited to, an antenna 104, a communication interface 106, one or more filters 108, and a controller 110 including one or more processors 112 and a memory 114.

The communication device 102 may include any communication device or communication node known in the art configured to receive signals 101a, 101b from one or more transmitting devices. In this regard, the antenna 104 may include any antenna or antenna element configured to receive any signals 101a, 101b known in the art including, but not limited to, communications signals, navigational signals, electronic warfare signals, and the like. The one or more signals 101a, 101b received by the communication device 102 may include desired/expected signals and/or interference signals. As it is used herein, the term "desired signals 101" ("expected signals 101") may refer to signals 101 which the communication device 102 expects and/or desires to receive, such as signals 101 transmitted from other communication devices 102 with which the communication device 102 is to communicate with. Conversely, the term "interference signals 101" may refer to signals which the communication device 102 does not desire/expect to receive, such as noise or jamming signals from an enemy transmitting device. Accordingly, embodiments of the present disclosure are directed to a system and method configured to detect and excise interference signals from the plurality of signals 101 received by the communication device 102.

In embodiments, the communication interface 106 is configured to receive the one or more signals 101a, 101b received by the antenna 104/communication device 102. It is contemplated herein that the communication interface 106 may include any communication circuitry, network interface, receiver, or transceiver known in the art configured to facilitate communication with other transmitting devices. In this regard, the communication interface 106 may be configured to communicatively couple to additional communication interfaces 106 of additional communication devices 102 and/or receive signals 101 from other transmitting devices using any wireless communication techniques known in the art including, but not limited to, radio frequency (RF), GSM, GPRS, CDMA, EV-DO, EDGE, WiMAX, 3G, 4G, 4G LTE, 5G, WiFi protocols, LoRa, and the like.

The communication interface 106 can be operatively configured to communicate with components of the communication device 102. For example, the communication interface 106 can be configured to retrieve data from the controller 110 or other devices, transmit data for storage in the memory 114, retrieve data from storage in the memory 114, and so forth. The communication interface 106 can also be communicatively coupled with the controller 110 to facilitate data transfer between components of the communication device 102 and the controller 110. It should be noted that while the communication interface 106 is described as a component of the communication device 102, one or more components of the communication interface 106 can be implemented as external components communicatively coupled to the communication device 102 via a wired and/or wireless connection. The communication interface 106 can also include and/or connect to one or more input/output (I/O) devices. In embodiments, the communication interface 106 includes or is coupled to a transmitter, receiver, transceiver, physical connection interface, or any combination thereof.

In embodiments, the communication interface 106 may be configured to receive the signals 101a, 101b, and direct an input signal to the controller 110 and/or one or more filters 108. The input signal generated by the communication interface 106 may include, or may be based upon, the received signals 101a, 101b. In some embodiments, the input signal generated by the communication interface 106 is directed to the one or more filters 108, wherein the one or more filters 108 are configured to perform one or more filtering functions and direct the resulting filtered input signal to the controller 110. The one or more filters 108 may include any filters known in the art including, but not limited to, match filters, bandpass filters, and the like. The filters 108 may be configured to filter the input signal to an expected spectral density of desired/expected signals 101. For example, an expected spectral density of desired/expected signals may be stored in memory 114, and the one or more filters 108 may be configured to perform one or more filtering functions to filter the input signal from the communication interface 106 to the expected spectral density.

In embodiments, the controller 110 includes one or more processors 112 configured to execute a set of program instructions stored in memory 114, wherein the set of program instructions are configured to cause the one or more processors 112 to carry out various steps/functions of the present disclosure. For example, the controller 110/processors 112 may be configured to: receive an input signal based on the one or more signals 101 received by the communication interface; perform one or more transform operations on the input signal to generate a spectral periodogram of the input signal; calculate spectral vector powers for each bin of the plurality of bins of the spectral periodogram; determine a median spectral power for a selected range of bins; generate a median-scaled spectral density vector based on the median spectral power and a reference spectral density of an expected signal; calculate a detection threshold vector based at least in part on the median-scaled spectral density vector; identify one or more interference-including bins of the spectral periodogram by comparing the spectral vector powers for each bin to the detection threshold vector; perform one or more excision operations on the one or more interference-including bins of the spectral periodogram to generate a modified spectral periodogram; and generate an output signal based on the modified spectral periodogram.

Figure 2:
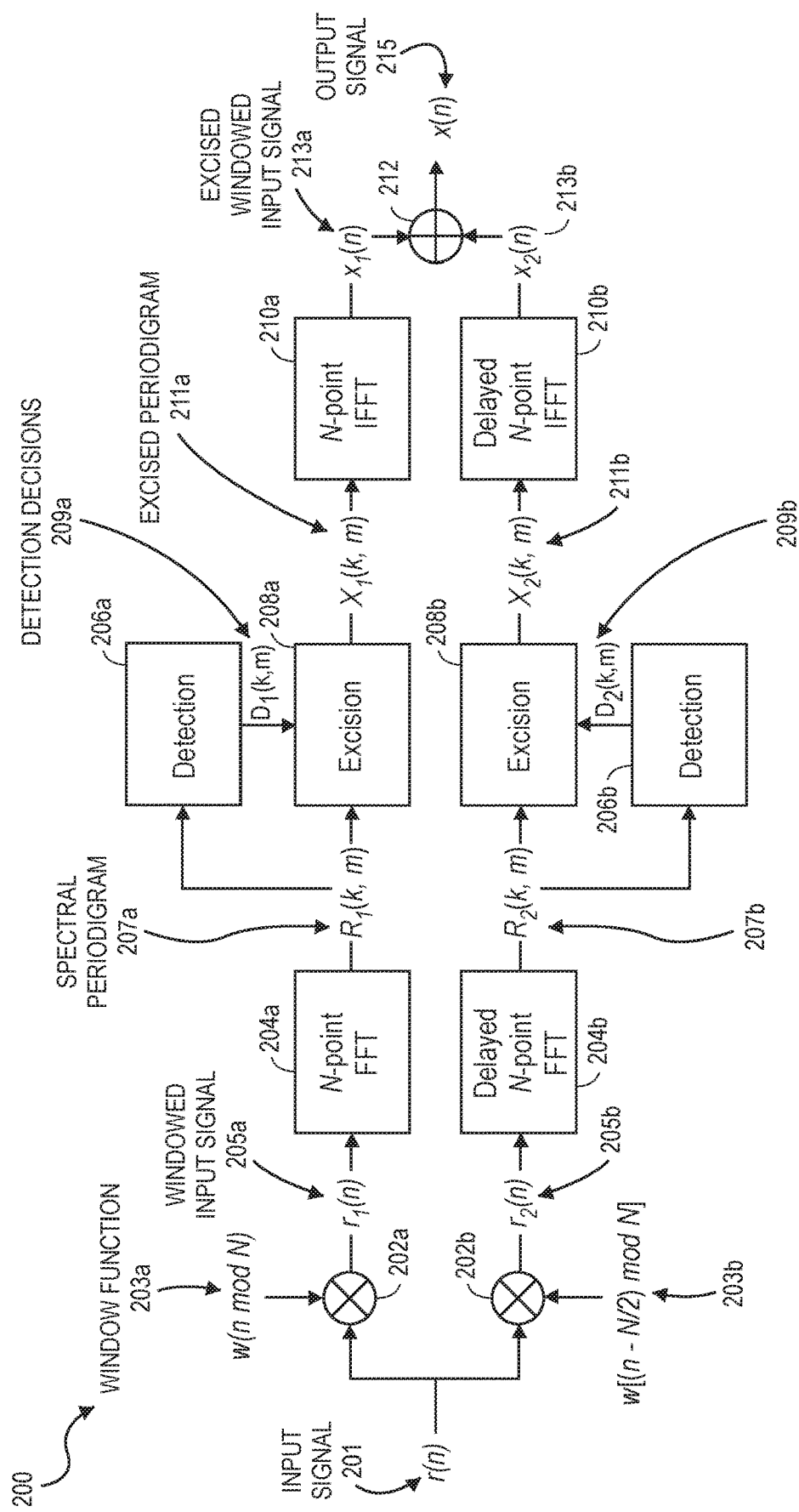
FIG. 2 illustrates a flowchart of a method for performing narrowband interference excision, in accordance with one or more embodiments of the present disclosure.

Each of the steps/functions carried out by the controller 110/processors 112 will be addressed in turn, and may be further understood with reference to FIG. 2.

FIG. 2 illustrates a flowchart of a method 200 for performing narrowband interference excision, in accordance with one or more embodiments of the present disclosure. It is noted herein that the steps of method 200 may be implemented all or in part by the communication device 102. It is further recognized, however, that the method 200 is not limited to the communication device 102 in that additional or alternative system-level embodiments may carry out all or part of the steps of method 200.

In embodiments, the controller 110 may be configured to receive an input signal 201 from the communication interface 106. For example, as shown in FIG. 2, the controller 110 may be configured to receive an input signal 201 (r(n)) from the communication interface 106. The input signal 201 (r(n)) may include a received discrete-time signal which includes and/or is based upon the one or more signals 101 received by the communication interface 106. In some embodiments, the input signal 201 (r(n)) may be filtered to a selected spectral density/spectral profile by the one or more filters 108. For example, the input signal 201 (r(n)) may be filtered by the one or more filters 108 to match a spectral density and/or spectral profile of expected/desired signals 101. Generally speaking, the input signal 201 (r(n)) may include a complex signal, with an in-phase component and a quadrature component.

In steps 202a, 202b, the controller 110 is configured to perform one or more windowing functions 203a, 103b on the input signal 201 (r(n)) to generate one or more windowed input signals 205a, 205b ($r_1(n)$, $r_2(n)$, . . . , $r_m(n)$). For example, in a step 202a, the input signal 201 (r(n)) may be mixed and/or multiplied with a first window function 203a to generate a first windowed input signal 205a ($r_1(n)$). Similarly, in a step 202b, the input signal 201 (r(n)) may be mixed and/or multiplied with a second window function 203b to generate a second windowed input signal 205b ($r_2(n)$).

As shown in FIG. 2, the window functions 203a, 203b may exhibit a length N, and may be selected from a wide range of well-known window functions used for spectral analysis. For example, the window functions 203a, 203b may include, but are not limited to, triangular window functions, rectangular window functions, sine window functions, Hann window functions, and the like. In some embodiments, the second windowing function 203b is different from the first window function 203a. For example, in some embodiments, as shown in FIG. 2, the second window function 203b may be delayed a half-window length with respect to the first window function 203a.

It is contemplated herein that such a delay between the first and second window functions 203a, 203b may result in two signal paths which are used in a "50% overlap-and-add" architecture in order to mitigate the effects of windowing on the time-domain waveform. In particular, the use of only a single path (e.g., only the "upper path") may result in negative amplitude-modulation effects which will distort the input signal 201 (r(n)) and reduce the efficiency of the method 200. The effects of windowing on the time-domain waveform of the input signal 201 (r(n)) will be discussed in further detail herein with respect to FIG. 4.

While method 200 is shown and described as generating two separate signal paths (e.g., an "upper path" and a "lower path"), this is not to be regarded as a limitation of the present disclosure, unless noted otherwise herein. In particular, it is contemplated herein that embodiments of the present disclosure may utilize any number of window functions 203a-203n to generate any number of signal paths. Additionally, while portions of the present disclosure may be limited to describing the "upper path" illustrated in FIG. 2, the description may also be regarded as applying to the "lower path" illustrated in FIG. 2, unless noted otherwise herein.

In steps 204a, 204b, the controller 210 may be configured to perform one or more transform operations on the input signal to generate a spectral periodogram 207a, 207b ($R_1(k,m), R_2(k,m)$) of the input signal 201 (r(n)). For example, in a step 204a, the controller 210 may be configured to perform one or more transform operations on the first windowed input signal 205a ($r_1(n)$) to generate a first spectral periodogram 207a ($R_1(k, m)$) of the first windowed input signal 205a ($r_1(n)$). Similarly, in a step 204b, the controller 210 may be configured to perform one or more transform operations on the second windowed input signal 205b ($r_2(n)$) to generate a second spectral periodogram 207b ($R_2(k, m)$) of the second windowed input signal 205b ($r_2(n)$).

The one or more transform operations performed in steps 204a, 204b may include any transform operations known in the art including, but not limited to, a discrete Fourier transform operation (e.g., fast Fourier transform (FFT) operation). By way of another example, the one or more transform operations may include a discrete frequency transform operation (e.g., discrete cosine transform operation), a wavelet transform operation, and the like. For example, as shown in FIG. 2, the controller 110 may be configured to perform one or more windowed N-point FFT operations in steps 204a, 204b in order to obtain frequency-domain representations of the input signal 201 (r(n)) and/or windowed input signals 205a, 205b ($r_1(n), r_2(n)$). In some embodiments, the one or more transform operations may be performed in real time and/or near-real time.

In embodiments, the spectral periodograms 207a, 207b ($R_1(k,m), R_2(k,m)$) generated by the windowed transform operations may each include a plurality of bins. For example, in embodiments where the transform operations include FFT operations (e.g., N-point FFT operations in steps 204a, 204b), the spectral periodograms 207a, 207b ($R_1(k,m), R_2(k,m)$) may include a plurality of frequency bins (FFT bins). In embodiments, k of the spectral periodograms 207a, 207b ($R_1(k,m), R_2(k,m)$) represents the $k^{th}$ bin (e.g., frequency bin) of the transform operation at a time m, wherein k=0, 1, 2, . . . N−1. The time m refers to the transform (e.g., FFT) of the input signal 201 (r(n)) over the time interval n=Nm, Nm+1, Nm+2, . . . Nm+N+1, wherein m=0, 1, 2 . . . . The spectral periodograms 207a, 207b ($R_1(k, m)$, $R_2(k, m)$) may additionally and/or alternatively be viewed as a collection of N discrete-time signals which are outputs of N bandpass filters which have been decimated by N.

In steps 206a, 206b, the spectral periodograms 207a, 207b ($R_1(k,m)$, $R_2(k,m)$) are used as inputs for detection operations configured to identify interference signals received by the communication device 102. The detection operations carried out in steps 206a, 206b may be further shown and described in FIG. 3.

Figure 3:
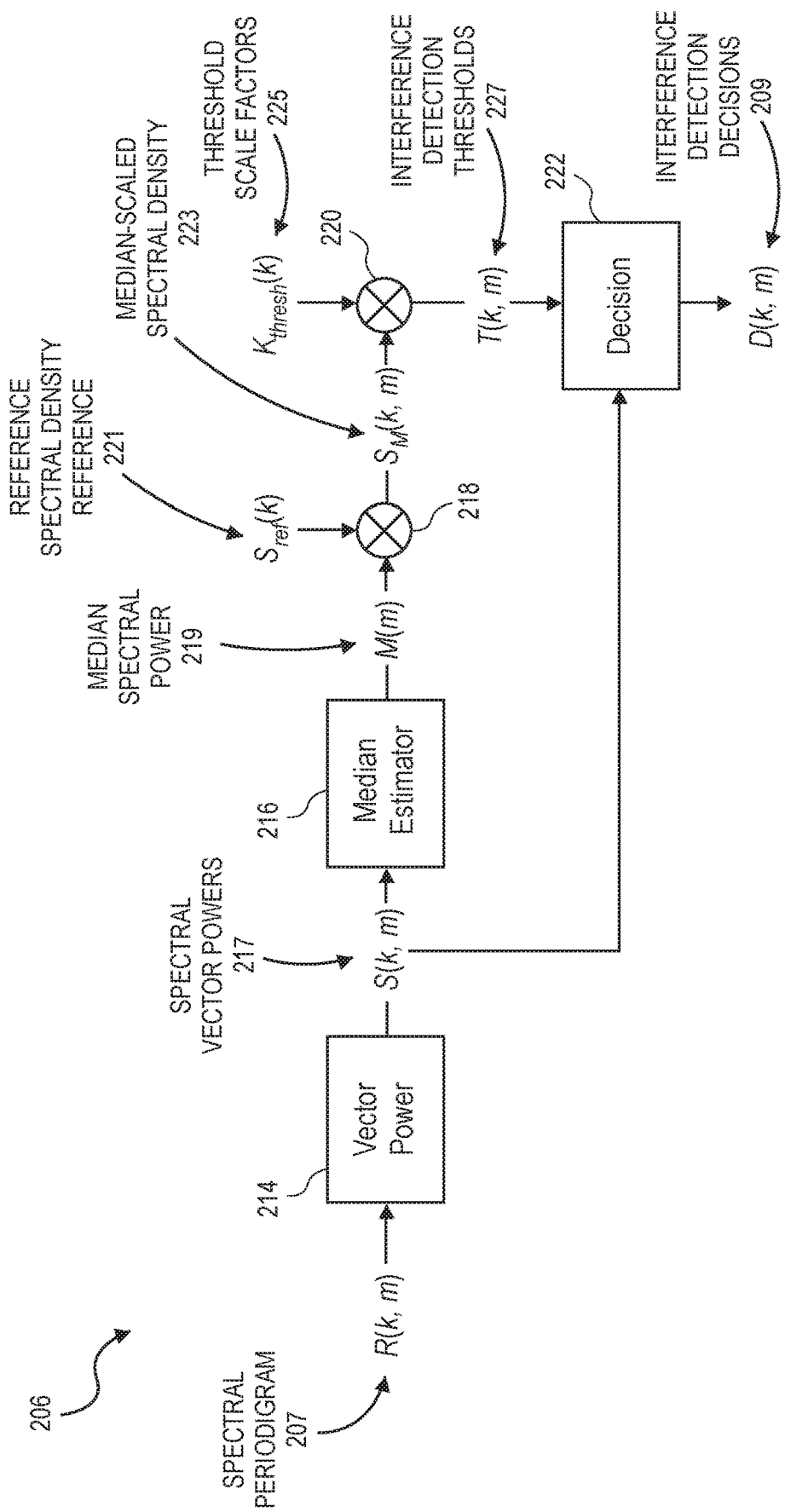
FIG. 3 illustrates a flowchart of a method for performing narrowband interference detection, in accordance with one or more embodiments of the present disclosure.

FIG. 3 illustrates a flowchart of a method 206 for performing narrowband interference detection, in accordance with one or more embodiments of the present disclosure. In particular, method 206 illustrates various steps/sub-steps carried out within the step 206a illustrated in FIG. 2. It is further noted herein, however, that the description associated with FIG. 3 may additionally be regarded as applying to the step 206b illustrated in FIG. 2.

In a step 214, the controller 110 is configured to calculate spectral vector power vectors 217 ($S_1(k,m)$, $S_2(k,m)$). The spectral vector power vectors 217 ($S_1(k,m)$, $S_2(k,m)$) may include a spectral vector power for each bin (e.g., frequency bin) of the plurality of bins of the spectral periodogram 207a, 207b ($R_1(k, m)$, $R_2(k, m)$). For example, as shown in FIG. 3, the controller 110 may be configured to perform vector power functions on the spectral periodogram 207 ($R(k, m)$) in order to generate a spectral vector power vector 217 ($S(k, m)$). In embodiments, the spectral vector powers may be determined by calculating the sums of the squares of the real portion and the imaginary portion of a complex vector associated with each bin (e.g., frequency bin) of the spectral periodogram 207 ($R(k, m)$) (e.g., $S(k, m)=\text{Real}(k, m)^2+\text{Imaginary}(k,m)^2$).

In a step 216, the controller 110 determines a median spectral power 219 ($M(m)$) for a selected range of bins of the plurality of bins of the spectral vector power vector 217 ($S(k, m)$). For example, the controller 110 may determine a median spectral power value for time m such that the median spectral power 219 ($M(m)$) may include a scalar value at each time m. It is noted herein that the selected range of bins which is used to determine the median spectral power 219 ($M(m)$) is a design choice, and may be manually and/or automatically adjusted by the controller 110 and/or a user (via a user interface) depending on desired performance characteristics of the method 200 and/or communication device 102.

By way of another example, the controller 110 may determine a median spectral power value for each bin, wherein the median spectral power value includes a median spectral power value across a selected range of bins centered about each respective bin. For instance, the controller 110 may order the spectral power values for each bin across the selected range of bins from highest to lowest, then determine the median spectral power value for the respective bin. In this example, the median spectral power 219 may include a frequency bin index $k(M(k, m))$ indicating that the median spectral power 219 is a vector of values across multiple bins.

It is contemplated herein that the median estimator illustrated in step 216 may be configured to provide a robust estimate of the prevailing spectral density which addresses the various shortfalls of previous interference excision techniques. For example, the median estimator in step 216 may provide a robust estimate of the prevailing spectral density which is insensitive to a small sub-set of bins which include high-powered interference signals. In particular, the median spectral power 219 ($M(m)$) may be insensitive to large, high-powered interference-including bins which would be considered as "outliers" and would therefore skew traditional interference excision techniques which are based on averages.

The median spectral power 219 ($M(m)$) may exhibit a spectral density which would be present in the absence of narrowband interference. This expected spectral density would include a combination of desired/expected signals 101, wideband noise, and wideband interference. Comparatively, a mean estimator (average) used by some conventional interference excision techniques would be heavily biased by even a single bin (e.g., frequency bin) which included a large amount of high-powered interference power. As a result, an average spectral power generated using averages/means would not accurately portray a desired/expected spectral density in the event of narrowband interference. Accordingly, by determining a median spectral power 219 ($M(m)$) utilizing an ordered statistic estimator (e.g., median estimator), embodiments of the present disclosure may mitigate negative interference detection effects attributable to conventional interference excision techniques.

It is noted herein that any ordered statistic estimator or other non-linear estimator may be used in step 216. Accordingly, the median estimator illustrated in step 216 is not to be regarded as a limitation of the present disclosure, unless noted otherwise herein. In this regard, the "median estimator" illustrated in step 216 may more generally be referred to as an "ordered statistic estimator" which is configured to determine an "ordered statistic spectral power" value, wherein the ordered statistic spectral power value includes a statistically-determined spectral power value across a selected range of bins. For example, instead of determining a median spectral power 219 ($M(m)$) in step 216, the controller 110 may instead be configured to determine an "ordered statistic spectral power 219," wherein each ordered statistic spectral power value is determined by selecting the $5^{th}$ largest, $9^{th}$ largest, $x^{th}$ largest, or some other ordered statistic metric. For the purposes of the present disclosure, the term "ordered statistic" may refer to any selection process (e.g., median, $5^{th}$ largest, $10^{th}$ largest, $2^{nd}$ smallest) which selects a value of a range of values dependent on the ordered magnitude of the range of values.

In a step 218, the controller 110 may be configured to generate a median-scaled spectral density vector 223 ($S_M(k, m)$) based on the median spectral power 219 ($M(m)$). In embodiments, the median-scaled spectral density vector 223 ($S_M(k,m)$) may also be determined based on a reference spectral density 221 ($S_{ref}(k)$) of an expected signal 101. In embodiments where step 216 includes other ordered statistic estimations and/or other non-linear estimations other than a median to generate an ordered-statistic spectral power 219, step 218 may generally be regarded as generating a "statistically-scaled spectral density vector 223 ($S_M(k,m)$)."

The reference spectral density 221 ($S_{ref}(k)$) may include an expected spectral density and/or spectral profile of the communication device 102. The reference spectral density 221 ($S_{ref}(k)$) (e.g., expected spectral density/profile/shape) may be determined by a known response of the communication interface 106 after filtering by the filters 108 prior to interference excision processing. Additionally and/or alternatively, the reference spectral density 221 ($S_{ref}(k)$) may be determined by a known spectral shape of a desired signal 101, or other a priori knowledge. In this regard, the reference spectral density 221 ($S_{ref}(k)$) may include an expected spectral density and/or spectral profile of desired/expected signals 101 received by the communication interface 106 in the absence of interference. In other words, the reference spectral density 221 ($S_{ref}(k)$) may include an expected/desired spectral shape of the input signal 201 (r(n)), and may be determined by a known filter shape of the one or more filters 108.

As shown in FIG. 3, the median spectral power 219 (M(m)) (e.g., ordered-statistic spectral power 219) scales the reference spectral density 221 ($S_{ref}(k)$) to produce a median-scaled (or, more generally, a statistically-scaled) estimate of a prevailing spectral density, which is expressed as the median-scaled spectral density vector 223 ($S_M(k,m)$) (or, more generally, the statistically-scaled spectral density vector 223). In other words, the median/ordered statistic spectral response (median spectral power 219) may be used to scale an expected spectral response of the communication device 102 (reference spectral density 221).

In a step 220, the controller is configured to calculate a detection threshold vector 227 (T(k,m))based at least in part on the statistically-scaled spectral density vector 223 (e.g., median-scaled spectral density vector 223 ($S_M(k, m)$)). In some embodiments, the detection threshold vector 227 (T(k, m)) may be further calculated based on one or more threshold scale factors 225 ($K_{thresh}(k)$). The detection threshold vector 227 (T(k, m)) may include interference-detection threshold values for each bin (e.g., frequency bin).

It is contemplated herein that the one or more threshold scale factors 225 ($K_{thresh}(k)$) may allow interference detection thresholds to be determined independently for each bin (e.g., frequency bin). In this respect, the one or more threshold scale factors 225 ($K_{thresh}(k)$) may be automatically and/or manually selected as a design choice dependent upon a desired/acceptable sensitivity to interference within each bin. Thus, the threshold scale factors 225 ($K_{thresh}(k)$) may be selected according to a trade-off between a probability of false-detection (false-positives) and a probability of missing interference (not detecting interference). For example, by using threshold scale factors 225 ($K_{thresh}(k)$), a detection threshold vector 227 (T(k, m)) may be generated which is more sensitive to interference in some bins, and less sensitive to interference in other bins. The detection threshold vector 227 (T(k, m)) may be selected according to any characteristics including, but not limited to, expected/historical frequency range of desired signals 101, expected/historical frequency range of interference signals 101, and the like.

It is further contemplated herein that the combination of the ordered-statistic estimation (e.g., median estimation) in step 216 and the use of the reference spectral density 221 ($S_{ref}(k)$) in step 218 may enable the computation of detection thresholds (e.g., detection threshold vector 227 (T(k,m))) which are robust (insensitive) to the presence of large narrowband interference. Accordingly, the robust interference-detection techniques enabled by method 200 may provide for reliable detection of narrowband interference, while maintaining a low false-detection rate in the presence of noise and/or a desired/expected signals 101a, 101b.

In a step 222, the controller 110 is configured to identify one or more interference-including bins (bins which include interference) of the plurality of bins of the spectral periodogram by comparing the spectral vector power vector 217 (S(k, m)) to the detection threshold vector 227 (T(k, m)). For example, the controller 110 may be configured to identify one or more interference-including bins by comparing a spectral vector power value for each bin of the plurality of bins to an associated detection threshold value for the respective bin within the detection threshold vector 227 (T(k, m)).

For instance, the controller 110 may compare a first spectral vector power value for a first bin with a first detection threshold value for the first bin, and a second spectral vector power value for a second bin with a second detection threshold value for the second bin. In this example, the controller 110 may determine that the first spectral vector power value for the first bin exceeds the first detection threshold value for the first bin, and may therefore determine that the first bin includes interference (e.g., the first bin is an interference-including bin). Conversely, the controller 110 may determine that the second spectral vector power value for the second bin does not exceed the second detection threshold value for the second bin, and may therefore determine that the second bin does not include interference (e.g., the second bin is not an interference-including bin).

In some embodiments, as shown in FIG. 3, the controller 110 may be configured comparing the spectral vector power vector 217 (S(k,m)) to the detection threshold vector 227 (T(k, m)) in order to generate a detection decision vector 209 (D(k, m)). The detection decision vector 209 (D(k, m)) may include an "interference decision" for each bin indicating whether or not the bin includes interference. For instance, the detection decision vector 209 (D(k, m)) may include a vector of "1s" and "0s," wherein "1s" are associated with interference-including bins (bins which have been determined to include interference), and "0s" are associated with bins which do not include interference.

It is noted herein that the controller 110 may not identify interference-including bins in each instance/implementation of method 200 and/or step 222. For example, the controller 110 may not identify any interference-including bins in step 222 when there is no interference within the received signals 101a, 101b. In instances where the controller 110 does not identify any interference-including bins, the detection decision vector 209 (D(k,m)) may include a vector of all "0s," indicating the absence of any identified interference-including bins.

Reference will again be made to FIG. 2. In steps 208a, 208b, the controller 110 may be configured to perform one or more excision operations to remove and/or selectively adjust identified interference-including bins. For example, as shown in FIG. 2, the controller 110 may be configured to receive the detection decision vector 209a, 209b ($D_1(k, m), D_2(k, m)$) which indicates one or more determined interference-including bins. The controller 110 may be further configured to receive the spectral periodogram 207a, 207b ($R_1(k,m), R_2(k,m)$), and perform one or more excision operations on the spectral periodogram 207a, 207b ($R_1(k, m), R_2(k, m)$) based on the respective detection decision vector 209a, 209b ($D_1(k, m), D_2(k, m)$). The controller 110 may be configured to perform the one or more excision operations on the one or more interference-including bins of the plurality of bins of the spectral periodogram 207a, 207b ($R_1(k,m), R_2(k,m)$) in order to generate a modified spectral periodogram 211a, 211b ($X(k, m), X_2(k, m)$).

The one or more excision operations performed in step 208a, 208b may include any excision operations or algorithms known in the art configured to modify, remove, or adjust identified interference-including bins. For example, in some embodiments of step 208a, 208b, the controller 110 may be configured to scale the signal magnitude value and/or the signal phase value of one or more interference-including bins of the spectral periodogram 207a, 207b ($R_1(k, m), R_2(k, m)$) to zero. In this example, each interference-including bin would be represented by zero values within the modified spectral periodogram 211a, 211b (X(k, m), $X_2(k,m)$). By way of another example, the signal magnitude value of one or more interference-including bins of the spectral periodogram 207a, 207b ($R_1(k, m)$, $R_2(k, m)$) may be set to some pre-defined or calculated value, while retaining the signal phase value of the respective interference-including bins.

In a step 210a, 210b, the controller 210 may be configured to perform one or more transform operations (e.g., inverse transform operations) on the modified spectral periodogram 211a, 211b ($X(k, m)$, $X_2(k, m)$) to generate a modified windowed input signal 213a, 213b ($x_1(n)$, $x_2(n)$). As noted previously herein, the one or more transform/inverse transform operations may include any transform operations known in the art including, but not limited to, a discrete Fourier transform operation (e.g., fast Fourier transform (FFT) operation, inverse FFT (IFFT)), a discrete frequency transform operation (e.g., discrete cosine transform operation), a wavelet transform operation, and the like. For example, as shown in FIG. 3, the controller 110 may be configured to perform one or more N-point IFFT operations on the modified spectral periodogram 211a, 211b ($X(k, m)$, $X_2(k, m)$) to generate a modified windowed input signal 213a, 213b ($x_1(n), x_2(n)$). The modified windowed input signal 213a, 213b ($x_1(n), x_2(n)$) may represent re-constructed versions of the windowed input signals 205a, 205b ($r_1(n)$, $r_2(n)$), with interference-including bins excised and/or modified.

In a step 212, the controller 110 may be configured to generate an output signal ($x(n)$) based on the modified spectral periodogram 211a, 211b ($X(k, m)$, $X_2(k, m)$). More particularly, the controller 110 may be configured to generate an output signal ($x(n)$) based on the modified windowed input signal 213a, 213b ($x_1(n)$, $x_2(n)$). For instance, the controller 110 may add the first modified windowed input signal 213a ($x_1(n)$) to the second modified windowed input signal 213b ($x_b(n)$) to generate the output signal ($x(n)$). It is noted herein that the output signal ($x(n)$) may include an aggregate of any number of modified windowed input signals 213a-213m ($x_1(n), \ldots, x_m(n)$), dependent on the number of "paths" or "branches" of the method 200 illustrated in FIG. 2. In practice, the output signal ($x(n)$) may represent a re-constructed version of the input signal ($r(n)$), with interference-including bins excised and/or modified.

After generation of the output signal ($x(n)$), the controller 110 may be configured to perform any signal-processing or demodulation techniques known in the art to analyze the received signals 101a, 101b, including conventional DSSS techniques. In this regard, the controller 110 may be regarded as a modem/demodulator, or, alternatively, may transmit the output signal ($x(n)$) to a separate modem/demodulator for signal processing.

Figure 4:
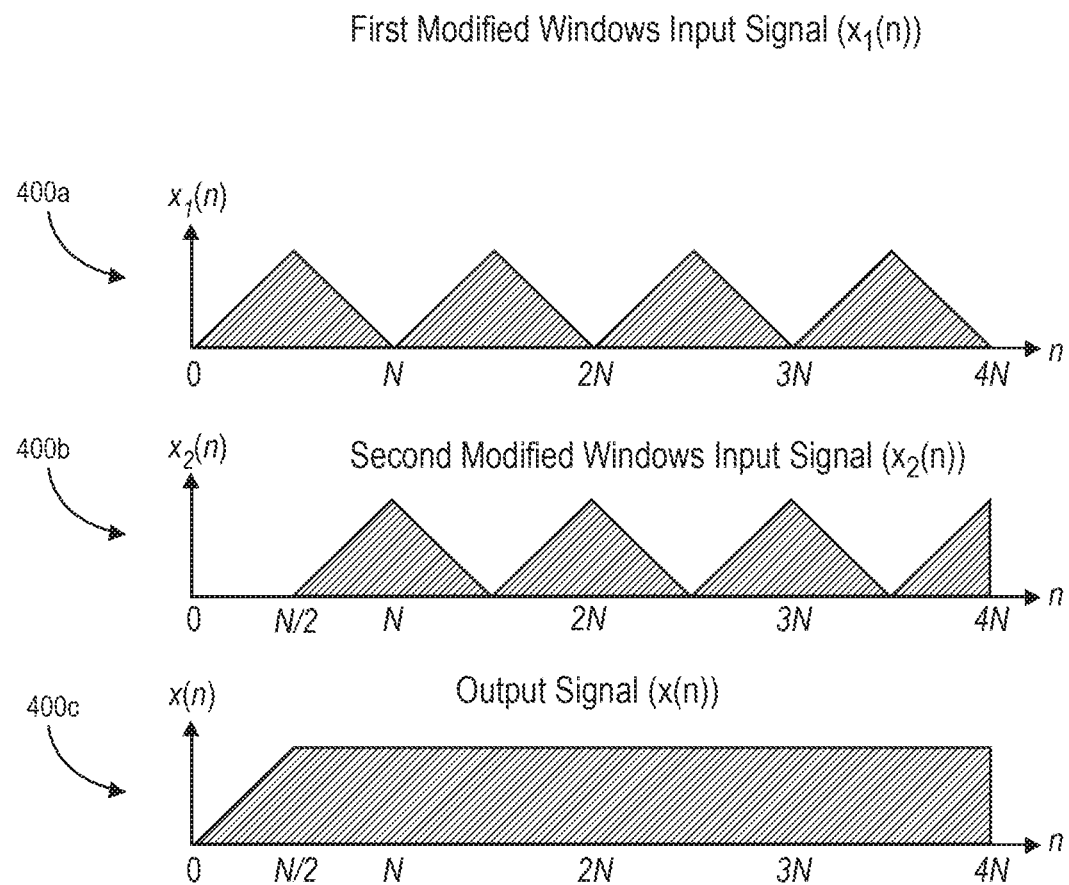
FIG. 4 illustrates a series of graphs depicting effects of windowing on a time-domain waveform, in accordance with one or more embodiments of the present disclosure.

FIG. 4 illustrates a series of graphs 400a, 400b, 400c depicting effects of windowing on a time-domain waveform, in accordance with one or more embodiments of the present disclosure. More particularly, graphs 400a, 400b, 400c illustrate potential effects of windowing on the modified windowed input signal 213a, 213b ($x_1(n), x_2(n)$).

As noted previously herein, in one example, the window functions 203a, 203b applied in step 202a, 202b and the FFT operations performed in step 204a, 204b may be delayed, with respect to each other, by half a window length, or by N/2 samples. This may result in two signal paths, illustrated in FIG. 2, which are used in a "50% overlap-and-add" architecture, which may be used to mitigate the effects of windowing on the time-domain waveform. The extent to which windowing effects may be mitigated may be dependent on the windowing functions used.

For instance, graph 400a illustrates a first modified windowed input signal 213a ($x_1(n)$) for a constant, real-valued input signal 201 ($r(n)$) with no bins excised. As shown in graph 400a, a first triangular window function (e.g., window function 203a ($w(n \bmod N)$)) may be used in step 202a, resulting in the graph 400a. As shown by graph 400a, the first triangular window function ($w(n \bmod N)$) results in significant distortion, even when no excision is performed.

Comparatively, graph 400b illustrates a second modified windowed input signal 213b ($x_2(n)$) for the input signal 201 ($r(n)$) with no bins excised. As shown in graph 400b, a second triangular window function (e.g., window function 203b ($w[(n-N/2) \bmod N]$)) may be used in step 202b, resulting in the graph 400b. As shown in graph 400b, the second triangular window function ($w[(n-N/2) \bmod N]$) may be delayed half a window length (e.g., delayed N/2 samples) with respect to the first triangular window function ($w(n \bmod N)$). Graph 400b also shows that the second triangular window function ($w[(n-N/2) \bmod N]$) also results in significant distortion.

Although each of the first and second window functions results in significant distortion on their own, summing graph 400a and graph 400b (e.g., summing first and second modified windowed input signal 213a, 213b ($x_1(n)$, $x_2(n)$) results in graph 400c, which illustrates the output signal ($x(n)$) (e.g., $x_1(n)+x_2(n)=x(n)$). Although both the first modified windowed input signal 213a ($x_1(n)$) and the second modified windowed input signal 213b ($x_2(n)$) are significantly distorted versions of the input signal 201 ($r(n)$), these distortion effects have been eliminated through the creation of the output signal ($x(n)$). As shown in graph 400c, the effects of windowing experienced by the first and second window functions individually may be reduced/eliminated by performing a plurality of window functions offset from one another.

Attendant advantages of the present disclosure may be further shown and described with reference to FIGS. 5A-5D. Graphs 500a-500d in FIGS. 5A-5D illustrate an example of the robust interference detection techniques of method 200 utilized with a 256-point FFT (step 204a, 204b) at a 32 MHz sample rate. The median estimator (step 216) used in graphs 500a-500d computed median spectral powers 219 ($M(m)$) across a selected range of sixty-five FFT bins centered at 0 Hz.

Figure 5A:
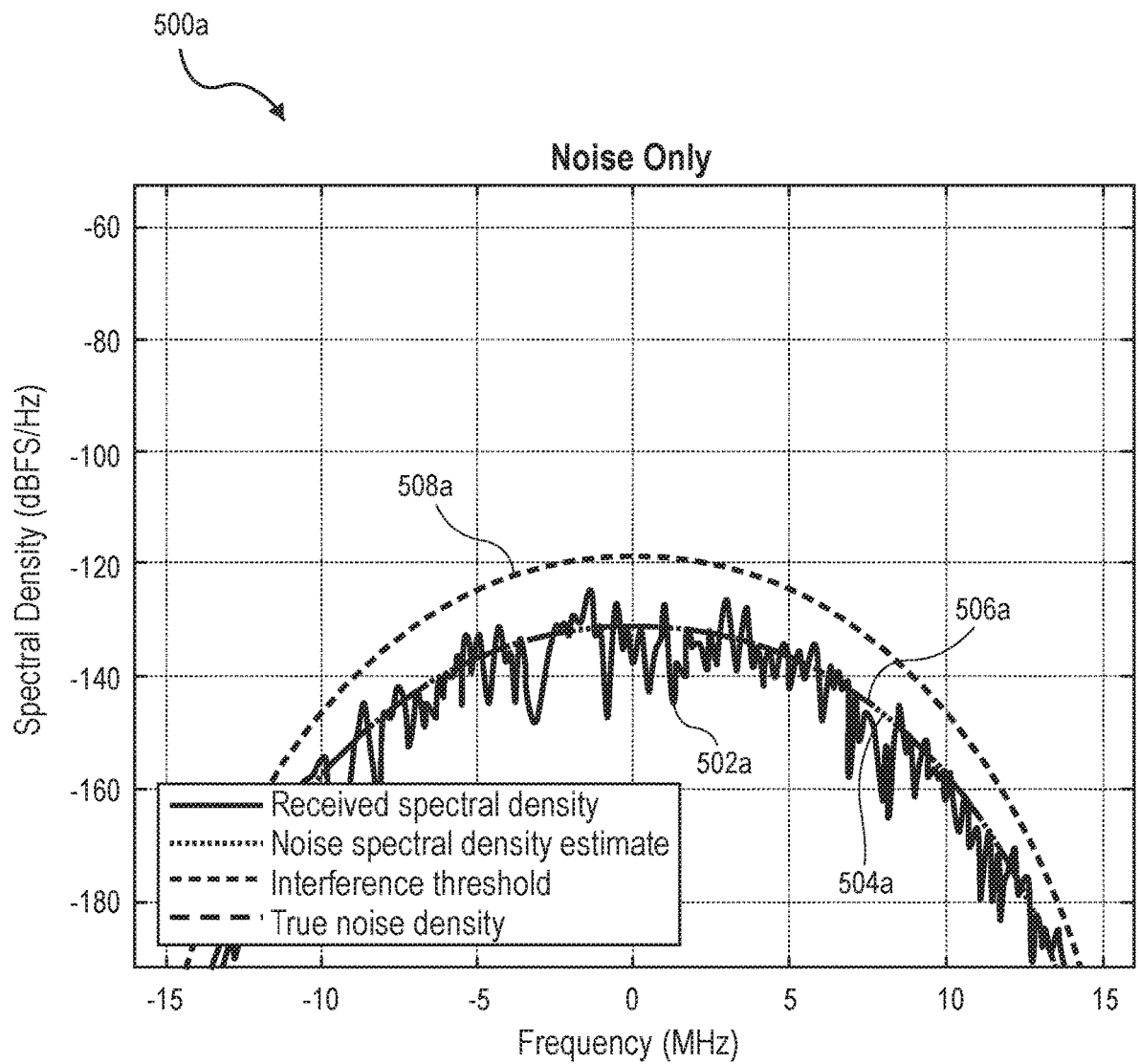
FIG. 5A is a graph illustrating the effects of narrowband interference excision, in accordance with one or more embodiments of the present disclosure.

FIG. 5A is a graph 500a illustrating the effects of narrowband interference excision, in accordance with one or more embodiments of the present disclosure. More particularly, graph 500a illustrates the effects of narrowband interference excision of method 200 when performed on noise only (no desired signals 101, no interference signals 101).

Curve 502a illustrates received spectral density of the noise received by a communication device 102. Curves 504a and 506a (which overlap in graph 500a) illustrate the noise spectral density estimate and the true noise density, respectively. Curve 508a illustrates the interference threshold (e.g., detection threshold vector 227 ($T(k,m)$)) determined via method 200. In embodiments, the difference between curve 508a and curve 504a may be attributable to the threshold scale factors 225 ($K_{thresh}(k)$), which scale the detection thresholds and allow interference detection thresholds to be determined independently for each bin. The use of the threshold scale factors 225 ($K_{thresh}(k)$) may allow for natural fluctuations in both received signals 101 and noise. As shown in graph 500a, embodiments of the present disclosure exhibit a low (e.g., zero) false-detection rate when only noise is received by the communication device.

Figure 5B:
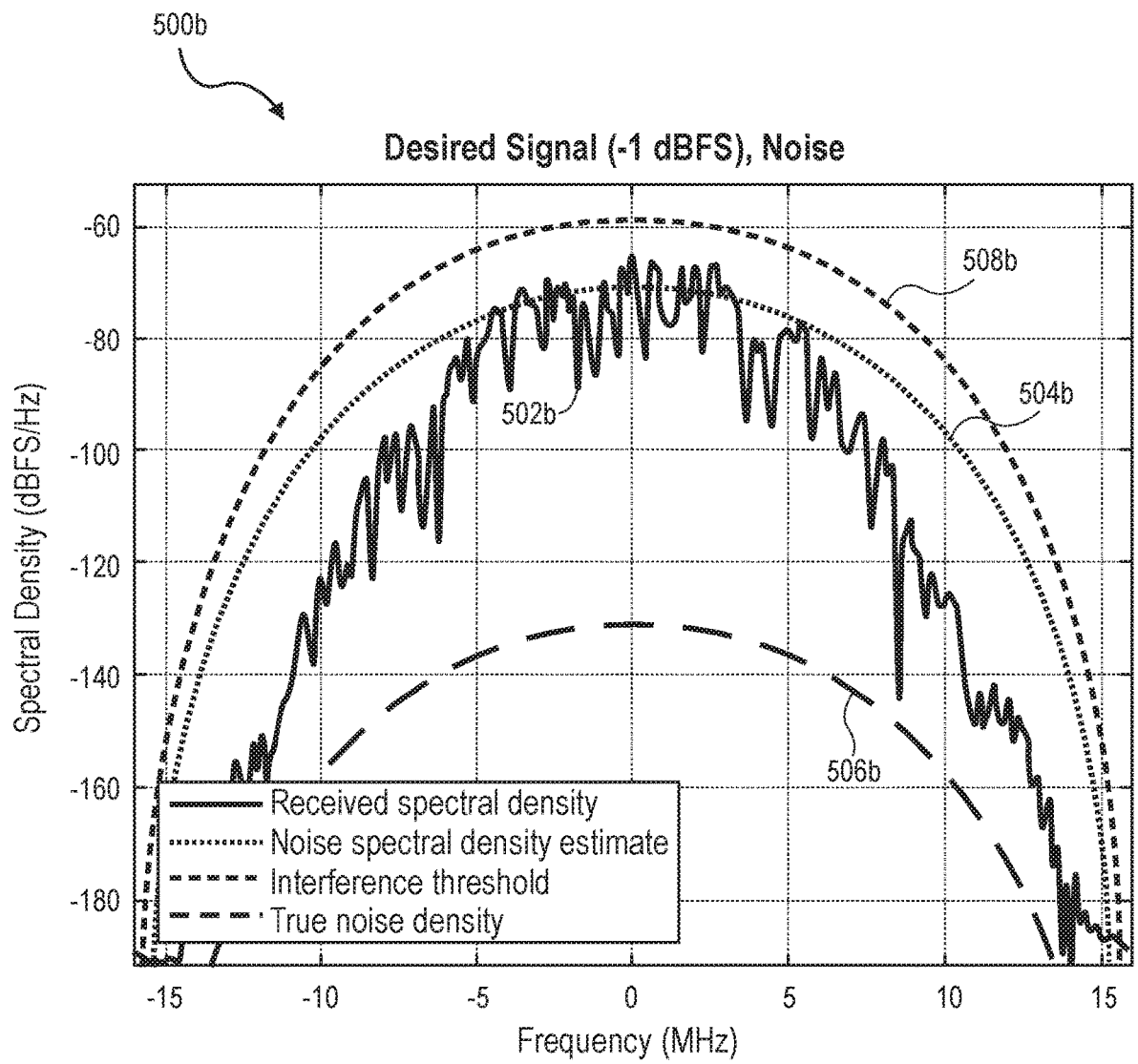
FIG. 5B is a graph illustrating the effects of narrowband interference excision, in accordance with one or more embodiments of the present disclosure.

FIG. 5B is a graph 500b illustrating the effects of narrowband interference excision, in accordance with one or more embodiments of the present disclosure. More particularly, graph 500b illustrates the effects of narrowband interference excision of method 200 when performed on received desired signals 101 in the presence of noise (no interference signals 101).

Curve 502b illustrates received spectral density of the desired signals 101 plus noise received by the communication device 102. Curve 504b illustrates the noise spectral density estimate, curve 506b illustrates true noise density, and curve 508b illustrates the interference threshold (e.g., detection threshold vector 227 (T(k,m))) determined via method 200. As noted previously herein with respect to graph 500a, the difference between curve 508b and curve 504b may be attributable to the threshold scale factors 225 ($K_{thresh}$(k)), which allow for natural power fluctuations in the received signals 101. As shown in graph 500b, embodiments of the present disclosure again exhibit a low (e.g., zero) false-detection rate when only desired signals 101 and noise is received by the communication device. In this regard, method 200 may correctly determine that no interference is received in the absence of narrowband interference signals.

Figure 5C:
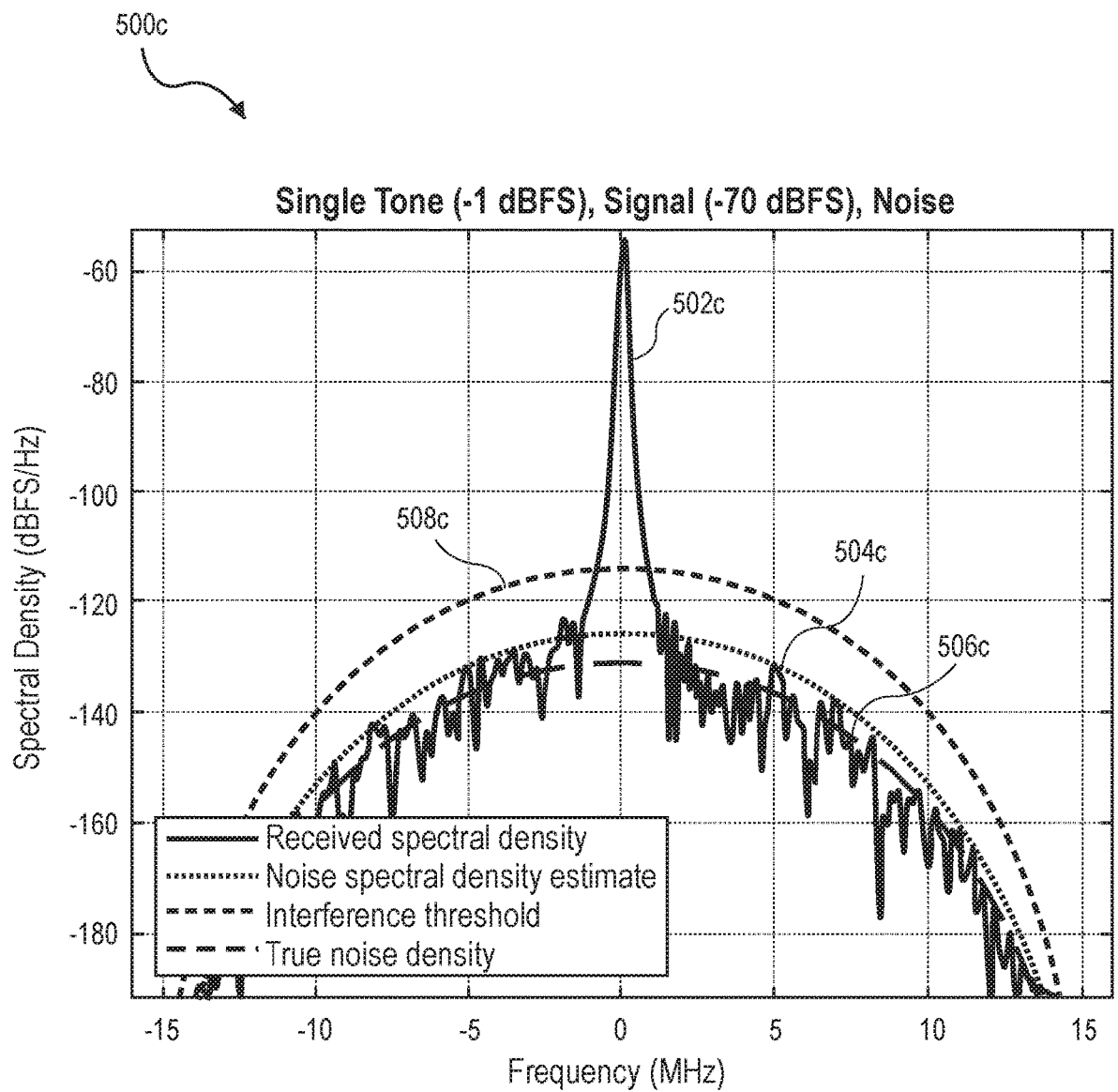
FIG. 5C is a graph illustrating the effects of narrowband interference excision, in accordance with one or more embodiments of the present disclosure.

FIG. 5C is a graph 500c illustrating the effects of narrowband interference excision, in accordance with one or more embodiments of the present disclosure. More particularly, graph 500c illustrates the effects of narrowband interference excision of method 200 when performed on received desired signals 101 in the presence of noise and a single-tone interference signal 101.

As shown in graph 500c, embodiments of the present disclosure may correctly identify the single-tone interference signal 101 as interference due to the fact that the interference signal 101 exceeds the curve 508c illustrating the interference threshold (e.g., detection threshold vector 227 (T(k,m))). Additionally, embodiments of the present disclosure again exhibit a low (e.g., zero) false-detection rate in that no portions of the received desired signals 101 were identified as interference.

Figure 5D:
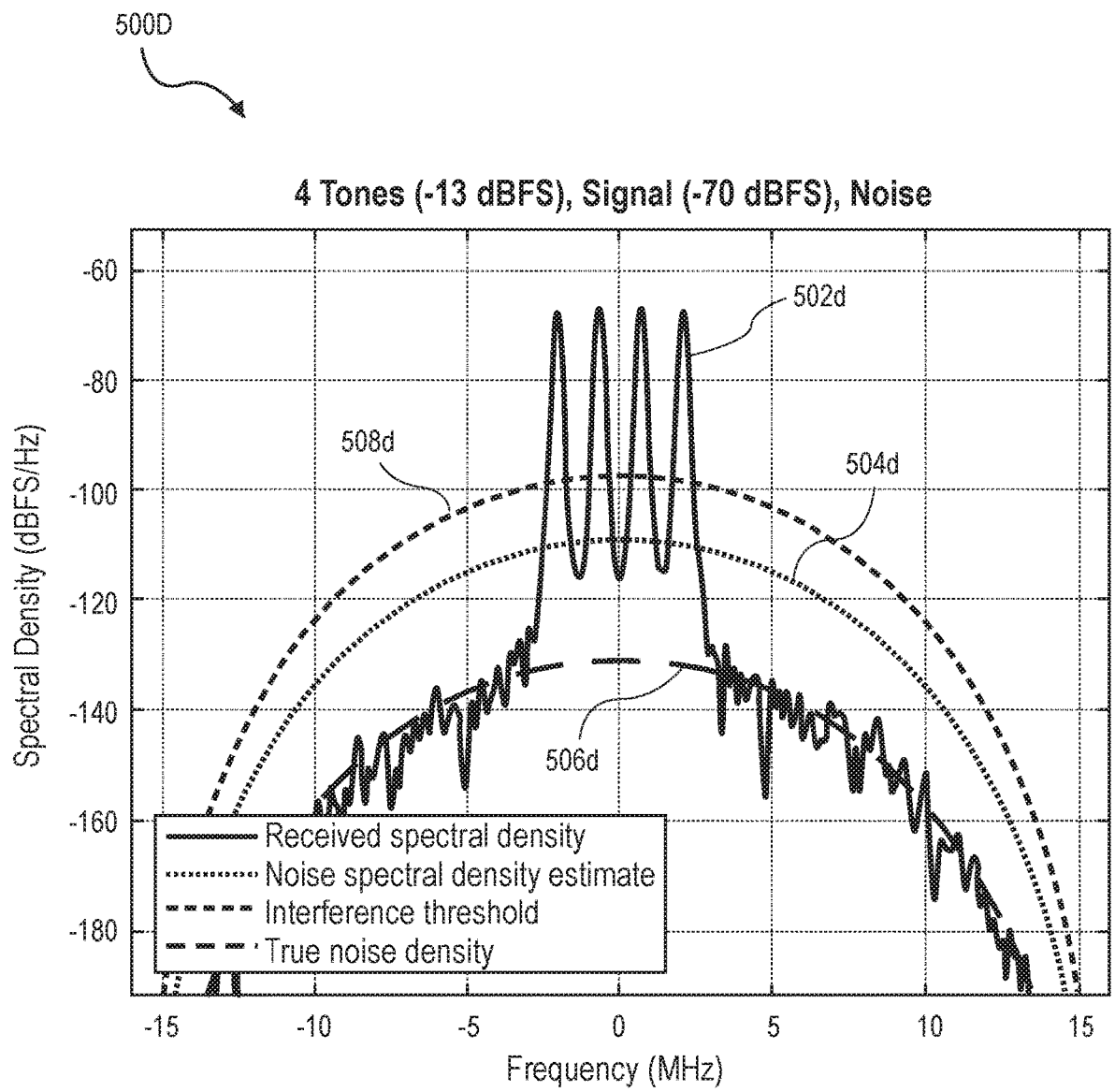
FIG. 5D is a graph illustrating the effects of narrowband interference excision, in accordance with one or more embodiments of the present disclosure.

FIG. 5D is a graph illustrating the effects of narrowband interference excision, in accordance with one or more embodiments of the present disclosure. More particularly, graph 500c illustrates the effects of narrowband interference excision of method 200 when performed on received desired signals 101 in the presence of noise and four separate interference signals 101. As shown in graph 500d, embodiments of the present disclosure may correctly identify the four separate interference signals 101, while simultaneously maintaining a low (e.g., zero) false-detection rate.

In one embodiment, the one or more processors 112 may include any one or more processing elements known in the art. In this sense, the one or more processors 112 may include any microprocessor-type device configured to execute software algorithms and/or instructions. In one embodiment, the one or more processors 112 may consist of a desktop computer, mainframe computer system, workstation, image computer, parallel processor, or other computer system (e.g., networked computer) configured to execute a program configured to operate the communication device 102, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 112. In general, the term "processor" may be broadly defined to encompass any device having one or more processing elements, which execute program instructions from memory 114. Moreover, different subsystems of the communication device 102 (e.g., antenna 104, communication interface 106, controller 110) may include processor or logic elements suitable for carrying out at least a portion of the steps described throughout the present disclosure. Therefore, the above description should not be interpreted as a limitation on the present disclosure but merely an illustration.

The memory 114 may include any storage medium known in the art suitable for storing program instructions executable by the associated one or more processors 112. For example, the memory 114 may include a non-transitory memory medium. For instance, the memory 114 may include, but is not limited to, a read-only memory (ROM), a random access memory (RAM), a magnetic or optical memory device (e.g., disk), a magnetic tape, a solid state drive and the like. It is further noted that memory 114 may be housed in a common controller housing with the one or more processors 112. In an alternative embodiment, the memory 114 may be located remotely with respect to the physical location of the processors 112, controller 110, and the like. In another embodiment, the memory 114 maintains program instructions for causing the one or more processors 112 to carry out the various steps described through the present disclosure.

Figure 6:
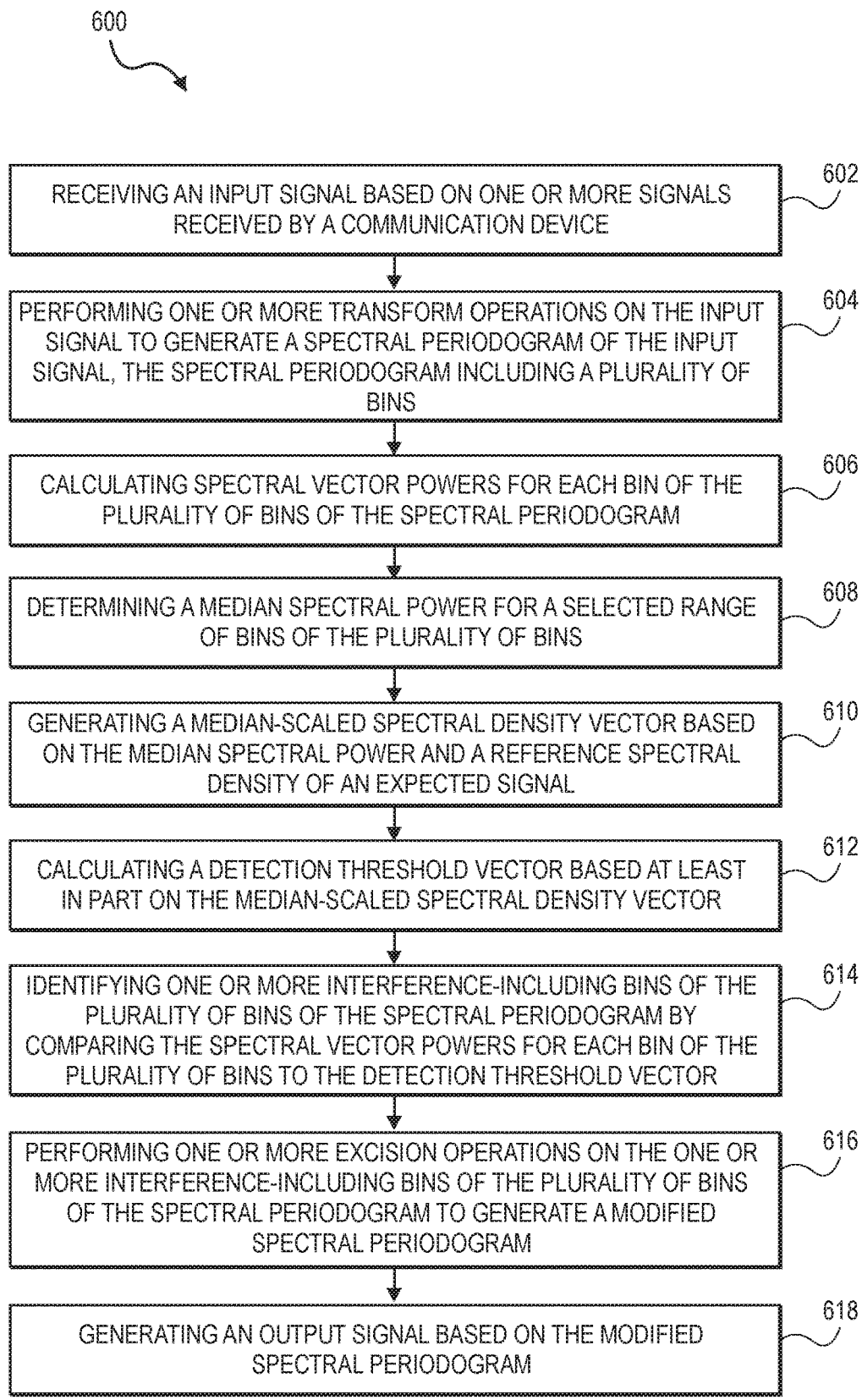
FIG. 6 illustrates a flowchart of a method for performing narrowband interference detection, in accordance with one or more embodiments of the present disclosure.

FIG. 6 illustrates a flowchart of a method 600 for performing narrowband interference detection, in accordance with one or more embodiments of the present disclosure. It is noted herein that the steps of method 600 may be implemented all or in part by the communication device 102. It is further recognized, however, that the method 600 is not limited to the communication device 102 in that additional or alternative system-level embodiments may carry out all or part of the steps of method 600.

In a step 602, an input signal is received. In embodiments, the input signal may be based on one or more signals received by a communication device. For example, as shown in FIG. 2, the controller 110 may be configured to receive an input signal 201 (r(n)) from the communication interface 106. The input signal 201 (r(n)) may include a received discrete-time signal which includes and/or is based upon the one or more signals 101 received by the communication interface 106.

In a step 604, one or more transform operations are performed on the input signal to generate a spectral periodogram of the input signal, the spectral periodogram including a plurality of bins. For example, in a step 204a, the controller 210 may be configured to perform one or more transform operations on the first windowed input signal 205a ($r_1$(n)) to generate a first spectral periodogram 207a ($R_1$(k, m)) of the first windowed input signal 205a ($r_1$(n)). Similarly, in a step 204b, the controller 210 may be configured to perform one or more transform operations on the second windowed input signal 205b ($r_2$(n)) to generate a second spectral periodogram 207b ($R_2$(k,m)) of the second windowed input signal 205b ($r_2$(n)).

In a step 606, spectral vector powers are calculated for each bin of the plurality of bins of the spectral periodogram. For example, as shown in FIG. 3, the controller 110 may be configured to perform vector power functions on the spectral periodogram 207 (R(k, m)) in order to generate a spectral vector power vector 217 (S(k, m)). The spectral vector power vector 217 (S(k,m)) may include a spectral vector power for each bin (e.g., frequency bin) of the spectral periodogram 207 (R(k, m)).

In a step 608, a median spectral power is determined for a selected range of bins of the plurality of bins. For example, the controller 110 may determine a median spectral power value for each bin, wherein the median spectral power value includes a median spectral power value across a selected range of bins centered about each respective bin.

In a step 610, a median-scaled spectral density vector is generated based on the median spectral power and a reference spectral density of an expected signal.

In a step 612, a detection threshold vector is calculated based at least in part on the median-scaled spectral density vector.

In a step 614, one or more interference-including bins of the plurality of bins of the spectral periodogram are identified by comparing the spectral vector powers for each bin of the plurality of bins to the detection threshold vector. In embodiments, the median-scaled spectral density vector 223 ($S_M(k,m)$) may also be determined based on a reference spectral density 221 ($S_{ref}(k)$) of an expected signal 101. In embodiments where step 216 includes other ordered statistic estimations and/or other non-linear estimations other than a median to generate an ordered-statistic spectral power 219, step 218 may generally be regarded as generating a "statistically-scaled spectral density vector 223 ($S_M(k,m)$)."

As noted previously herein, the controller 110 may not identify interference-including bins in each instance/implementation of method 200 and/or step 222. For example, the controller 110 may not identify any interference-including bins in step 222 when there is no interference within the received signals 101a, 101b. In instances where the controller 110 does not identify any interference-including bins, the detection decision vector 209 (D(k,m)) may include a vector of all "0s," indicating the absence of any identified interference-including bins.

In a step 616, one or more excision operations are performed on the one or more interference-including bins of the plurality of bins of the spectral periodogram to generate a modified spectral periodogram. For example, as shown in FIG. 2, the controller 110 may be configured to receive the detection decision vector 209a, 209b ($D_1(k,m),D_2(k,m)$) which indicates one or more determined interference-including bins. The controller 110 may be further configured to receive the spectral periodogram 207a, 207b ($R_1(k, m)$, $R_2(k, m)$), and perform one or more excision operations on the spectral periodogram 207a, 207b ($R_1(k, m)$, $R_2(k, m)$) based on the respective detection decision vector 209a, 209b ($D_1(k, m)$, $D_2(k, m)$). The controller 110 may be configured to perform the one or more excision operations on the one or more interference-including bins of the plurality of bins of the spectral periodogram 207a, 207b ($R_1(k, m),R_2(k,m)$) in order to generate a modified spectral periodogram 211a, 211b ($X(k, m)$, $X_2(k, m)$).

In a step 618, an output signal is generated based on the modified spectral periodogram. For instance, the controller 110 may add the first modified windowed input signal 213a ($x_1(n)$) to the second modified windowed input signal 213b ($x_b(n)$) to generate the output signal (x(n)). In practice, the output signal (x(n)) may represent re-constructed version of the input signal (r(n)), with interference-including bins excised and/or modified.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A communication device comprising:
  a communication interface configured to receive one or more signals from one or more transmitting devices; and
  a controller including one or more processors configured to carry out a set of program instructions stored in memory, the set of program instructions configured to cause the one or more processors to:
    receive an input signal based on the one or more signals received by the communication interface;
    perform one or more transform operations on the input signal to generate a spectral periodogram of the input signal, the spectral periodogram including a plurality of bins;
    calculate spectral vector powers for each bin of the plurality of bins of the spectral periodogram;
    determine an ordered statistic spectral power for a selected range of bins of the plurality of bins;
    generate a statistically-scaled spectral density vector based on the ordered statistic spectral power and a reference spectral density of an expected signal;
    calculate a detection threshold vector based at least in part on the statistically-scaled spectral density vector; and
    identify one or more interference-including bins of the plurality of bins of the spectral periodogram by comparing the spectral vector powers for each bin of the plurality of bins to the detection threshold vector.

2. The communication device of claim 1, wherein the controller is further configured to:
  perform one or more excision operations on the one or more interference-including bins of the plurality of bins of the spectral periodogram to generate a modified spectral periodogram; and
  generate an output signal based on the modified spectral periodogram.

3. The communication device of claim 2, wherein performing one or more excision operations on the one or more interference-including bins of the plurality of bins of the spectral periodogram to generate the modified spectral periodogram comprises:
  scaling at least one of a signal magnitude value or a signal phase value of each of the one or more interference-including bins of the spectral periodogram to zero.

4. The communication device of claim 2, wherein performing one or more excision operations on the one or more interference-including bins of the plurality of bins of the spectral periodogram to generate the modified spectral periodogram comprises:

scaling a signal magnitude value of each of the one or more interference-including bins to a pre-selected signal magnitude value; and retaining a signal phase value of each of the one or more interference-including bins of the spectral periodogram.

5. The communication device of claim 1, wherein identifying the one or more interference-including bins of the plurality of bins of the spectral periodogram comprises:

comparing the spectral vector powers for each bin of the plurality of bins to the detection threshold vector to generate a detection decision vector; and identifying the one or more interference-including bins of the plurality of bins based on the detection decision vector.

6. The communication device of claim 1, wherein identifying one or more interference-including bins of the plurality of bins of the spectral periodogram comprises:

identifying one or more spectral vector powers for one or more bins of the plurality of bins which exceed an associated detection threshold value of the detection threshold vector.

7. The communication device of claim 1, wherein calculating the detection threshold vector based at least in part on the statistically-scaled spectral density vector comprises:

calculating the interference detection threshold vector based at least in part on the statistically-scaled spectral density vector and one or more threshold scale factors.

8. The communication device of claim 1, wherein the spectral vector powers comprise a sum of the squares of a real portion and an imaginary portion of a complex vector within each bin of the plurality of bins of the spectral periodogram.

9. The communication device of claim 1, wherein the expected spectral density for the one or more signals comprises a filter shape of one or more filters of the communication device.

10. The communication device of claim 1, wherein the one or more transform operations comprise a fast Fourier transform (FFT) operation.

11. The communication device of claim 1, wherein the one or more transform operations comprise at least one of a discrete frequency transform operation or a wavelet transform operation.

12. The communication device of claim 1, wherein performing one or more transform operations on the input signal to generate the spectral periodogram of the input signal comprises:

performing one or more transform operations on the input signal to generate a first spectral periodogram of the input signal including the plurality of bins and an additional spectral periodogram of the input signal including a plurality of bins.

13. The communication device of claim 12, wherein performing one or more excision operations on the one or more interference-including bins of the plurality of bins of the spectral periodogram to generate a modified spectral periodogram comprises:

performing one or more excision operations on the one or more interference-including bins of the plurality of bins of the first spectral periodogram to generate a first modified spectral periodogram; and performing one or more excision operations on one or more interference-including bins of the plurality of bins of the additional spectral periodogram to generate an additional modified spectral periodogram, wherein generating an output signal based on the modified spectral periodogram comprises generating an output signal based on the first modified spectral periodogram and the additional modified spectral periodogram.

14. The communication device of claim 12, wherein the ordered statistic spectral power comprises a median spectral power.

15. A method for performing narrowband interference detection, comprising:

receiving an input signal based on one or more signals received by a communication device;

performing one or more transform operations on the input signal to generate a spectral periodogram of the input signal, the spectral periodogram including a plurality of bins;

calculating spectral vector powers for each bin of the plurality of bins of the spectral periodogram;

determining a median spectral power for a selected range of bins of the plurality of bins;

generating a median-scaled spectral density vector based on the median spectral power and a reference spectral density of an expected signal;

calculating a detection threshold vector based at least in part on the median-scaled spectral density vector;

identifying one or more interference-including bins of the plurality of bins of the spectral periodogram by comparing the spectral vector powers for each bin of the plurality of bins to the detection threshold vector;

performing one or more excision operations on the one or more interference-including bins of the plurality of bins of the spectral periodogram to generate a modified spectral periodogram; and generating an output signal based on the modified spectral periodogram.

\* \* \* \* \*